United States Patent
Zeavelou et al.

(10) Patent No.: US 11,093,321 B1
(45) Date of Patent: Aug. 17, 2021

(54) SYSTEM AND METHOD FOR AUTOMATICALLY UPDATING AN INFORMATION HANDLING SYSTEM UPON SYSTEM CRASH

(71) Applicant: DELL PRODUCTS, LP, Round Rock, TX (US)

(72) Inventors: Palani Raja Zeavelou, Puducherry (IN); Santosh Gore, Bangalore (IN); Raveendra Babu Madala, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/816,756

(22) Filed: Mar. 12, 2020

(51) Int. Cl.
 *G06F 11/07* (2006.01)
 *G06F 8/65* (2018.01)
 *G06F 11/14* (2006.01)

(52) U.S. Cl.
 CPC ........... *G06F 11/0793* (2013.01); *G06F 8/65* (2013.01); *G06F 11/0706* (2013.01); *G06F 11/079* (2013.01); *G06F 11/0751* (2013.01); *G06F 11/0766* (2013.01); *G06F 11/1417* (2013.01); *G06F 11/1433* (2013.01); *G06F 2201/805* (2013.01)

(58) Field of Classification Search
 CPC ............ G06F 11/0793; G06F 11/1417; G06F 11/1433; G06F 11/0766; G06F 11/0706; G06F 11/0751; G06F 11/079; G06F 8/65; G06F 8/656; G06F 8/658; G06F 8/66; G06F 9/4411; G06F 9/4413
 See application file for complete search history.

(56) References Cited

U.S. PATENT DOCUMENTS

| | | | |
|---|---|---|---|
| 7,886,185 B1* | 2/2011 | Okcu ................... | G06F 9/4411 719/328 |
| 9,146,748 B1* | 9/2015 | Kumar ................ | G06F 11/1469 |
| 9,389,878 B1* | 7/2016 | Chan ..................... | G06F 21/572 |
| 9,507,581 B2 | 11/2016 | Butcher et al. | |
| 2014/0129882 A1* | 5/2014 | Harden ............... | G06F 11/0718 714/57 |
| 2016/0202964 A1* | 7/2016 | Butcher ................... | G06F 8/65 717/172 |
| 2017/0300371 A1* | 10/2017 | Soffer ................. | G06F 11/3072 |

(Continued)

OTHER PUBLICATIONS

Olsen, Gary, How to troubleshoot the blue screen of death for Windows 10, Jul. 2, 2019, TechTarget, Retrieved from Google: https://searchenterprisedesktop.techtarget.com/tip/How-to-troubleshoot-the-blue-screen-of-death-for-Windows-10 (Year: 2019).*

*Primary Examiner* — Bryce P Bonzo
*Assistant Examiner* — Albert Li
(74) *Attorney, Agent, or Firm* — Larson Newman, LLP

(57) ABSTRACT

An information handling system includes a management controller that receives a notification associated with a stop error, captures a screenshot that includes a matrix bar code associated with the stop error, and scans the matrix bar code to retrieve a stop code corresponding to the stop error. If a component associated with the stop error is not updated, then an update for the component may be downloaded to a non-volatile storage device. An update table is generated that includes a location of the update in the non-volatile storage device; and on reboot the update table may be read to determine the location of the update.

20 Claims, 3 Drawing Sheets

(56) References Cited

U.S. PATENT DOCUMENTS

2019/0250897 A1 8/2019 Gore et al.
2019/0250928 A1 8/2019 Vidyadhara et al.
2019/0361695 A1 11/2019 Gore et al.
2019/0379656 A1 12/2019 Gore et al.

* cited by examiner

SYSTEM AND METHOD FOR AUTOMATICALLY UPDATING AN INFORMATION HANDLING SYSTEM UPON SYSTEM CRASH

FIELD OF THE DISCLOSURE

The present disclosure generally relates to information handling systems, and more particularly relates to automatically updating an information handling system upon system crash.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system includes a management controller that receives a notification associated with a stop error, captures a screenshot that includes a matrix bar code associated with the stop error, and scans the matrix bar code to retrieve a stop code corresponding to the stop error. If a component associated with the stop error is not updated, then an update for the component may be downloaded to a non-volatile storage device. An update table is generated that includes a location of the update in the non-volatile storage device; and on reboot the update table may be read to determine the location of the update.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
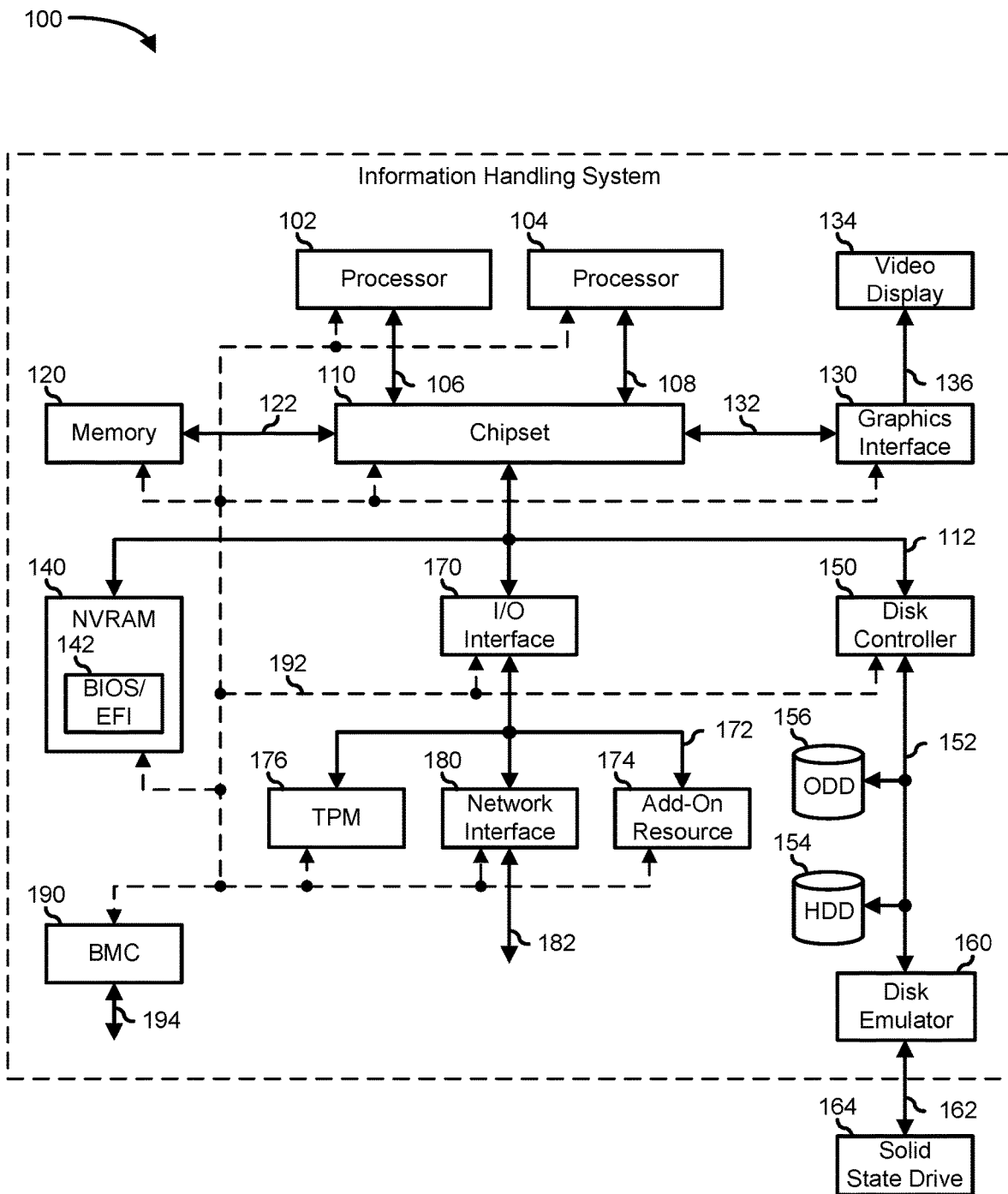
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/unified extensible firmware interface (BIOS/UEFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random-Access Memory (DRAM) DIMMs, Static Random-Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/UEFI module 142 that stores machine-executable code (BIOS/UEFI code) that operates to detect the resources of information handling system 100, to provide drivers for the resources, to initialize the resources, and to provide common access mechanisms for the resources. The functions and features of BIOS/UEFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/UEFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

A stop error is displayed as an error screen on an information handling system with a Windows® operating system after a fatal system error also referred to as a catastrophic failure or a system crash. The stop error is commonly called blue screen of death (BSOD) or simply blue screen which is similar to a "kernel panic" that occurs during the system crash of an information handling system with a non-Windows operating system. For simplicity, the present disclosure uses the term stop error to include the term kernel panic.

The stop error usually occurs because of low-level software or firmware crash, bad drivers, corrupted Windows registries, misconfigured device drivers, corrupted files, outdated drivers, hardware issues, etc. Generally, a user reaches out to someone in technical support to address the issue who usually recommends installing a device firmware and/or software update to upgrade the device firmware and/or software to the latest version. At this point, the user generally downloads and installs an update package that typically addresses the issue. However, manually searching, downloading, and installing the update package in addition to talking with a technical support specialist is a time-consuming process. In addition, this process is error-prone as the user may download and install the wrong update package. Finally, the user may not be able to download and install the update package if the information handling system fails during reboot.

The present disclosure improves the aforementioned process by automatically identifying an update associated with the stop error and determining whether the information handling system needs the update. In addition, the present disclosure automatically downloads and installs the update without manual intervention. This reduces technical support calls from users who encountered the stop error and efficiently addresses the issue for the convenience of the users.

Figure 2:
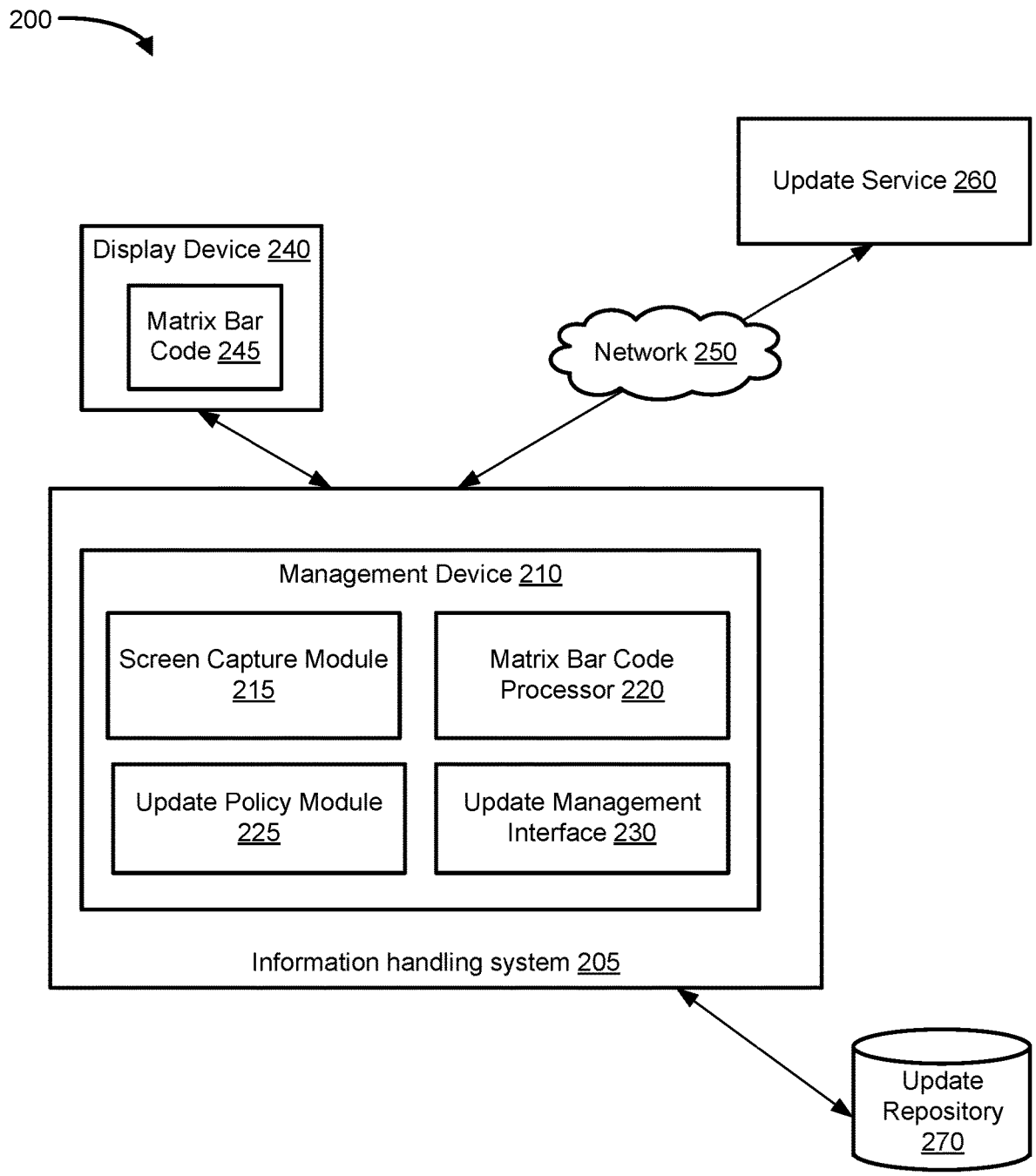
FIG. 2 is a block diagram illustrating an example of a system for automatically updating the information handling system upon system crash, according to an embodiment of the present disclosure.

FIG. 2 shows a system 200 for automatically updating an information handling system upon system crash. System 200 includes information handling system 205 which similar to information handling system 100, as depicted in FIG. 1. System 200 also includes a display device 240, an update service 260, a network 250, and an update repository 270.

Information handling system 205 includes a management device 210 that includes a screen capture module 215, a matrix bar code processor 220, an update policy module 225, and an update management interface 230.

Management device 210 represents one or more processing devices, such as a dedicated BMC similar to BMC 190 of FIG. 1, an SoC device, one or more associated memory devices, one or more network interface devices, a complex programmable logic device (CPLD), a service processor, a management controller, and the like, that operate together to provide a management environment for information handling system 205. In particular, management device 210 is connected to various components of information handling system 205 via various internal communication interfaces, such as the LPC interface, the I2C interface, a PCIe interface, or the like, to provide an out-of-band mechanism to retrieve information related to the operation of the information handling system 205, to provide BIOS/UEFI or system firmware updates, to manage non-processing components of information handling system 205, such as system cooling fans and power supplies. Management device 210 can include a network connection to an external management system, and the management device can communicate with the management system to report status information for information handling system 205, to receive BIOS/UEFI or system firmware updates, or to perform other tasks for managing and controlling the operation of information handling system 205. Management device 210 can operate off of a separate power plane from the components of the host environment so that the management device receives power to manage information handling system 205 when the information handling system is otherwise shut down. An example of management device 210 may include a commercially available BMC product that operates in accordance with the IPMI specification, such as the iDRAC, or the like. Management device 210 may further include associated memory devices, logic devices, security devices, or the like, as needed or desired.

Screen capture module 215 may be configured to perform a screen capture of display device 240 with a matrix bar code 245. For example, screen capture module 215 may use a camera of information handling system 205 to take the screen capture or screenshot. Management device 210 may direct screen capture module 215 to take the screen capture upon detection of the stop error. Screen capture module 215 may transmit the screen capture to matrix bar code processor 220 as an image file. In another embodiment, screen capture module 215 may transmit a location of the image file to matrix bar code processor 220. In addition to the screenshot, the image file may include context data such as the time of the screen capture and an identifier associated with information handling system 205.

Matrix bar code processor 220 may be configured to identify and parse matrix bar code 245 in the screen capture and obtain a stop code and/or the cause of the stop error. When the stop error occurs, the operating system typically creates a dump file that includes information associated with the system crash and saves it in the information handling system, such as a Windows "minidump" file. Matrix bar code processor 220 may use the dump file along with the stop code, the cause of the stop error, and the context data in determining the failed component and an update for the failed component and/or a dependent component if any. The failed component may also be referred to as a target component which may be hardware, software, or a service component.

Update policy module 225 may be configured to determine based on an update policy whether or not to apply the update to the target component. The update policy may reflect an additional limit or limitations on the ability of management device 210 or the BIOS/UEFI to apply the update. The update policy may dictate whether the firmware of the target component can be updated, cannot be updated, can be updated to a specific version, or downgraded to the specific version. For example, if the firmware of the target component has a version number, such as A06 which may be located in a header file, then the update policy may, for example, allow an upgrade to a version A07, but not versions A08, and may also allow a downgrade to version A04 but not A05. Thus, the update policy allows an additional level of control which allows management device 210 and/or the BIOS/UEFI to broadly identify which version of firmware or software may be updated.

Update management interface 230 may be configured to allow user access to management device 210 and/or its components such as screen capture module 215, matrix bar code processor 220, and update policy module 225. In an embodiment, a user can create and/or edit an update policy associated with update policy module 225. In this manner, update policies can be established to ensure that specific types of enforcement associated with the updates can be applied. For example, the user can modify the update policy to notify the user on application of an update if the stop error occurs. Also, the user can modify the update policy to forcefully apply an update if the stop error occurs. In addition, the user can modify the update policy to not apply the update if the stop error occurs. Additionally, because the user can have several information handling systems, the user can modify the update policy to be applied globally to all or some of the information handling systems without having to access each of the individual information handling systems.

Matrix bar code 245 is a machine-readable optical label, such as a quick response (QR) code that includes information regarding the stop error such as the stop code and the cause of the stop error. Matrix bar code 245 is displayed at display device 240 at stop error. Display device 240 may include other information in addition to matrix bar code 245.

Update service 260 may be a web service configured to include, manage and maintain a data store or a library that includes device drivers, device driver packages, operating system components, and/or applications. Update service 260 may be configured to update the device drivers of an information handling system upon demand or when a new device driver is posted, published, or distributed on the update service 260. Update service 260 may an update service of the vendor of the device, the developer of the operating system, a third-party update service, etc.

Network 250 may use any one or more of a variety of networks or another type of communication connection as known to those skilled in the art. The type of communication connection used may vary with certain system parameters and requirements, such as those related to bandwidth and throughput required in accordance with a rate of data requests as may be issued by information handling system 205. The communication connection may be a network connection, bus, and/or another type of data link, such as a hardwire connection, a network cable, wireless or WiFi® protocols, or other connections known in the art.

Update repository 270 may be configured to store updates for one or more components of information handling system 205 and other information handling systems communicatively coupled to it such as via a wireless area network or a local area network. Update repository 270 can include a server and a persistent memory where the updates are persisted. In a particular embodiment, the server can be a file server, a database server, or the like. The persistent memory can include one or more disk drives or other suitable persistent memory. When the server is a database server, the updates within the repository can be organized as a database. When the server is a file server, the file server can locate a file corresponding to the update and send it to the information handling system 205. In some particular embodiments, a local update repository such as update repository 270 is optional and may not be used. Update repository 270 may also include configuration data or information regarding the components of information handling system 205. The configuration data may include the driver, firmware, software version and/or its updates installed in each of the components. In addition, the configuration data may include a service tag, a computer model, a part number, a license number of the software purchased and/or installed service, warranty information, etc.

On detection of a system crash, management device 210 may scan matrix bar code 245 at display device 240. Management device 210 may use the matrix bar code 245 and the configuration information to detect whether the component of information handling system 205 associated with the stop error has the latest updates installed or not. If the firmware or software of the component is out of date, then management device 210 downloads and installs or applies the latest update package from update service 260 or update repository 270 based on an update policy. In general, the component is updated using the latest firmware and/or software version. To determine where to download the update from, management device 210 may query configuration data of the component to identify the publisher, a location of the update such as a uniform resource locator (URL), a device identifier, a vendor identifier, a publisher, etc. The method may retrieve an update package with the latest driver, firmware and/or software version of the component from update repository 270 or update service 260. The update package may also include new firmware and/or software associated with the component.

The update package may include additional information also referred to as update package metadata that assists the management device 210 in correlating or mapping the matrix bar code 245 with a specific update. The update package metadata may include a firmware or software version identifier, a component identifier of the target device, a manufacturer identifier of the target device, the stop code associated with the stop error, a timestamp associated with the stop error, a fingerprint of the update package which may be used to validate the update package, etc. In an embodiment, the firmware and/or software version identifier is a globally unique identifier. Management device 210 may be configured to locate the additional information in the update package, which may be a stand-alone file of various formats such as an extensible markup language data file, a text file, a JavaScript object notation (JSON) format, etc. In addition, management device 210 may use a policy associated with the component and/or information handling system to determine various options for the update such as whether to update, to not update, update to a specific version, or to rollback.

In a particular embodiment, management device 210 may download the update package to a non-volatile storage device such as a mounted removable storage device, the update repository, an internal HDD, SSD, etc. The management device and/or BIOS/UEFI may determine based on information in the update package metadata and/or policy whether to install the update package during one of the bootstrap stages such as during the BIOS power-on self-test (POST), the initialization of hardware components, and the loading of the operating system. For example, if the update is for a critical hardware component that should be updated prior to the loading of the operating system, such as a video card, a wireless network card, etc., the update may be performed prior to or during the initialization of the hardware component. In one embodiment, the BIOS/UEFI may install the update package from an initial download location. The initial download location may be a partition in a mounted non-volatile storage device such as MAS002 or the Maser partition. In addition, rollback information may be written to the Maser partition during the update process in case the update fails. The Maser partition is used by the management device and a controller configured to update the information handling system even without an operating system, such as a Dell Lifecycle controller. In another embodiment, the BIOS/UEFI may copy the update the update package from the initial download location to another location such as a UEFI partition for update on reboot. The UEFI partition may be located in another non-volatile storage device that is distinct from the mounted non-volatile storage device. In yet another embodiment, the update may be downloaded and installed from the UEFI partition. The update may be installed by the operating system or the boot loader from the second location.

In one embodiment, the management device 210 or a boot firmware component would generate an update table such as a Windows platform binary table (WPBT) subsequent to the system crash. The update table may be generated prior to or at the reboot of the information handling system. As used herein, the update table may describe the physical memory location of the update package. For example, the update table may include a pointer to a physical memory region. On reboot, the boot loader or a Windows session manager may search for the update table and read the update table to determine the location of the update package and/or installation instructions according to the update policy if any. In another embodiment, a host agent that integrates operating system features with management device 210 similar to an iDRAC service module (iSM) applies the update package staged at the physical memory region. After installation, the operating system may reclaim the physical memory region described in the update table.

Figure 3:
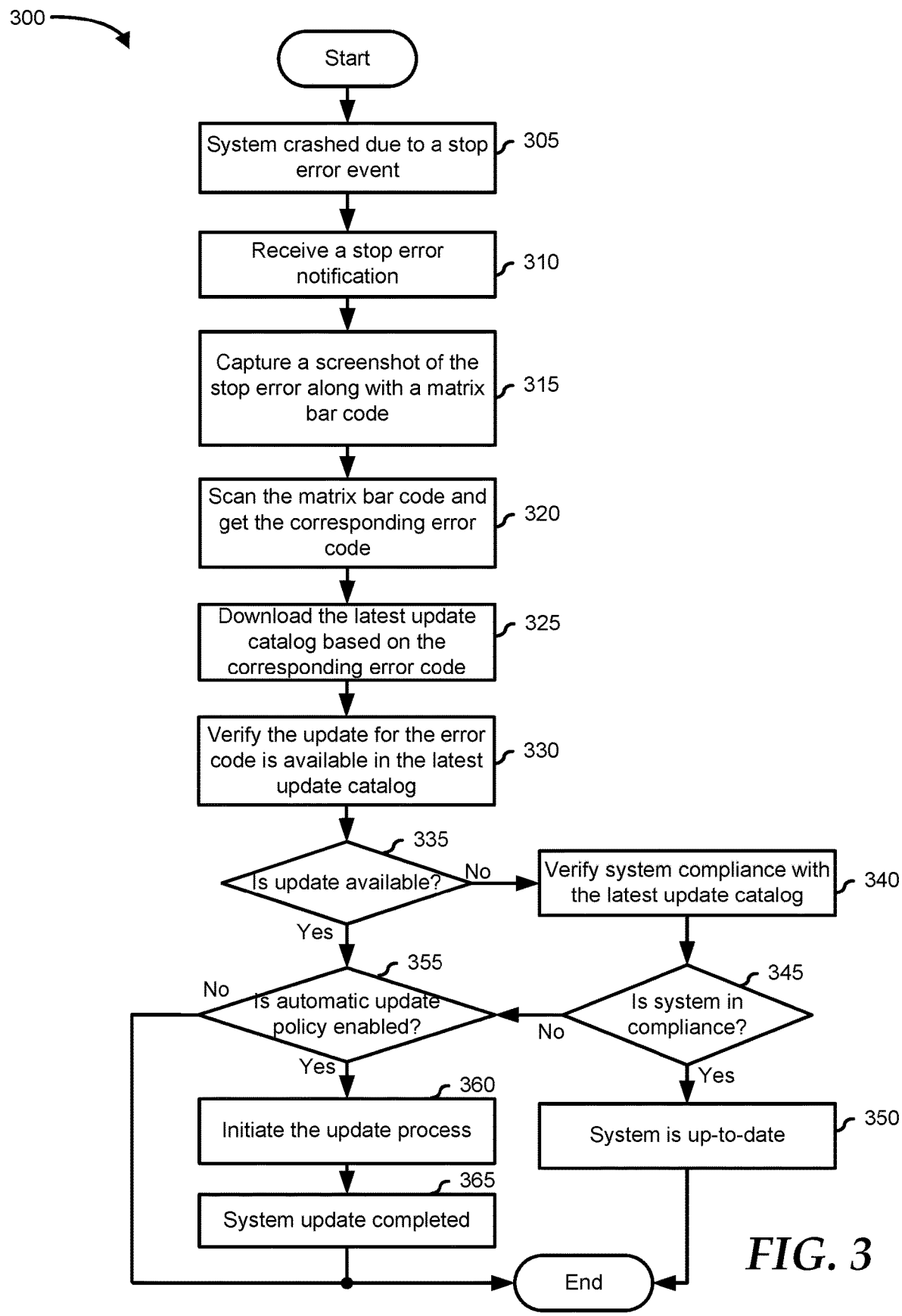
FIG. 3 is a flowchart illustrating an example of a method for automatically updating the information handling system upon system crash, according to an embodiment of the present disclosure.

FIG. 3 shows a method 300 for automatically updating the failed component of the information handling system on system crash. Method 300 may be performed by one or more components of information handling system 205, as depicted in FIG. 2. In particular, method 300 may be performed by management device 210 and/or the BIOS/UEFI. Method 300 typically starts at block 305 where the information handling system encountered a stop error due to a system crash. The stop error occurs when the operating system kernel or a driver running in the kernel mode of the operating system encounters an unrecoverable error. This is usually caused by an illegal operation being performed.

The information handling system may display a screen with a message that it ran into a problem and needs to restart. Depending on the error code also referred to as stop code, the stop error may display the address where the problem occurred, along with the driver, firmware or software which is loaded at that address. The stop error may include information on the loaded driver, firmware, or software and a stack dump. The driver information may include the base address of the driver, the driver's creation date such as a timestamp, and the name of the driver. For example, the stop error may include a hexadecimal-based error code or stop code such as 0x0000000A. This stop code means that the operating system or a kernel-mode driver accessed paged memory at DISPATCH LEVEL or above. The stop error may also show text associated with the stop code such as "IRQL_NOT_LESS_OR_EQUAL.".

The method proceeds to block 310 where the management device receives an event notification associated with the stop error. The method then proceeds to block 315 where the management device captures a screenshot of the stop error along with the matrix bar code. After capturing the screenshot, at block 320, the management device scans the matrix bar code and retrieves information associated with the stop error such as the stop code, the address where the error occurred, and/or the loaded driver, firmware or software. Based on the retrieved information, the management device may also identify the component associated with the stop error. The management device may retrieve configuration information regarding the component including but not limited to the firmware and/or software associated with the component and its installed version.

At block 325, the method determines and downloads the latest update catalog based on the retrieved information. The update catalog may be downloaded from a catalog repository, an update service and/or a local repository. For example, the update catalog may be downloaded from Windows Update (WU) which is a service provided by Microsoft® that manages the distribution of software updates, including updates to the Windows operating system itself as well as device drivers and firmware developed by Microsoft, original equipment manufacturers (OEMs), and other providers. The update catalog may be a catalog file that includes information regarding which updates are desirable for the information handling system and/or its components and how to apply them. For example, the update catalog includes information regarding the latest version of software updates, firmware updates, drivers, hotfixes, etc. for various components. The update catalog can be used in conjunction with the software update management functionality of various update deployment management systems to for automation BIOS, firmware, driver and software updates. The update catalog may be downloaded into an internal non-volatile storage, a local update repository, etc.

At block 330, the method may verify that the update associated with the stop error or the stop code is available based on the update catalog. In one example, the method may determine that an update is available for the component at a remote update service maintained by the manufacturer or developer of the failed component. The determination can be made by comparing one or more of firmware and/or software version identifiers, update package fingerprint or hash, or the like of the update at the remote update service with the information in the update catalog.

At decision block 335, the method may determine whether the update is available for the stop error or the stop code is available. If the update is available, then the "YES" branch is taken, and the method proceeds to decision block 355. If the update is not available, then the "NO" branch is taken, and the method proceeds to block 340. At block 340, the method verifies whether the information handling system is in compliance with the update catalog. The method determines whether the information handling system is in compliance by determining whether the information handling system has the latest updates based on the information in the update catalog. For example, the method may compare an update version in the information handling system to the update version in the update catalog. The update will be shown as installed if the update version matches any of the installed versions. The method may generate a compliance report based on the comparison. The update will be shown as applicable if the update version is greater than the lowest installed version, and the update version is not equal to any of the installed versions. The update is not applicable if the update version is lower than all the installed versions.

At decision block 345, the method may determine whether the information handling system is in compliance with the update catalog. If the information handling system is in compliance, then the "YES" branch is taken and the method proceeds to block 350. If the information handling system is not in compliance, then the "NO" branch is taken, and the method proceeds to decision block 355. At block 350, the information handling system is determined to be up-to-date and does not need the update. A status may be displayed to the user via an interface, such as to allow the user to confirm that the information handling system is up-to-date. Then the method ends.

At decision block 355, the method may determine whether the automatic update policy is enabled. The automatic update policy identifies whether to allow automatic updates to the information handling system without manual intervention. If the automatic update policy is enabled, then the "YES" branch is taken, and the method proceeds to block 360. If the automatic update policy is not enabled, then the "NO" branch is taken, and the method ends.

At block 360, the method initiates the download and installation of the update. The update may be downloaded to an initial location and copied or staged at a different location, such as the UEFI partition. The method may initiate the installation of the update after performing verification, such as using a checksum or signature verification or other suitable processes and may require a reboot of the information handling system. After installation of the latest update, at block 365 the system update is completed, and the method ends. Prior to the end, an update status may be displayed to the user via an interface, such as to allow the user to confirm that the update has been successfully completed.

Although FIG. 3 shows example blocks of method 300 in some implementation, method 300 may include additional blocks, fewer blocks, different blocks, or differently arranged blocks than those depicted in FIG. 3. Additionally, or alternatively, two or more of the blocks of method 300 may be performed in parallel. For example, block 305 and block 310 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
   receiving, by a management controller, a notification associated with a stop error;
   in response to receiving the notification, capturing a screenshot of the stop error, wherein the screenshot includes a matrix bar code;
   scanning the matrix bar code to retrieve a stop code corresponding to the stop error;
   determining a component that is associated with the stop code and whether the component is updated; and
   in response to determining that the component is not updated:
      downloading an update for the component to a non-volatile storage device;
      generating an update table that includes a location of the update in the non-volatile storage device; and
      storing the update table for use on reboot to determine the location of the update in the non-volatile storage device.

2. The method of claim 1, further comprising installing the update from the non-volatile storage device.

3. The method of claim 1, wherein an update package that includes the update also includes metadata for correlating the stop error with the update.

4. The method of claim 1, further comprising applying limitations on the update to the component based on an update policy.

5. The method of claim 4, wherein the update policy includes a limitation to install the update if the stop error occurs.

6. The method of claim 4, wherein the update policy includes a limitation to not install the update if the stop error occurs.

7. The method of claim 4, wherein the update policy includes a limitation to provide notification that the update has been installed if the stop error occurs.

8. The method of claim 1, wherein the reading of the update table is performed by a Windows session manager.

9. The method of claim 1, wherein the location of the update is a unified extensible firmware partition.

10. An information handling system, comprising:
    a management controller configured to:
       receive a notification associated with a stop error;
       capture a screenshot that includes a matrix bar code associated with the stop error;
       scan the matrix bar code to retrieve a stop code corresponding to the stop error;
       if a component associated with the stop error is not updated, then download an update for the component to a non-volatile storage device;
       generate an update table that includes a location of the update in the non-volatile storage device; and
    a processor configured to:
       read, on reboot, the update table to determine the location of the update; and
       install the update.

11. The information handling system of claim 10, wherein the management controller is further configured to download an update catalog.

12. The information handling system of claim 11, wherein the management controller is further configured to determine whether the update for the component is available based on the update catalog.

13. The information handling system of claim 10, wherein the update is included in an update package that includes information that maps the stop error to the update.

14. The information handling system of claim 10, wherein the update table is a Windows platform binary table.

15. A non-transitory computer readable medium storing instructions that when executed cause a processor to:
    provide a notification associated with a stop error to prompt a screenshot capture of the stop error, a scan of a matrix bar code associated with the stop error, a determination of an update associated with the stop error based on the matrix bar code, and a download of the update to a first non-volatile storage location;
    determine whether a component associated with the stop error is not updated; and
    in response to the determination that the component is not updated:
       read an update table to determine the first non-volatile storage location of the update; and
       copy the update from the first non-volatile storage location to a second non-volatile storage location for installation on reboot.

16. The non-transitory computer readable medium of claim 15, further storing instructions, that when executed by the processor, cause the processor to install the update from the second non-volatile storage location.

17. The non-transitory computer readable medium of claim 15, wherein an update package that includes the update also includes metadata that maps the matrix bar code to the update.

18. The non-transitory computer readable medium of claim 17, wherein the first non-volatile storage location is a partition in a mounted storage used during an update process.

19. The non-transitory computer readable medium of claim 18, wherein the second non-volatile storage device is a unified extensible firmware partition.

20. The non-transitory computer readable medium of claim 16, wherein the update table was generated prior to the reboot.

* * * * *